United States Patent [19]

Tanaka et al.

[11] Patent Number: 5,339,317
[45] Date of Patent: Aug. 16, 1994

[54] PACKET COMMUNICATIONS NETWORK AND COMMUNICATIONS METHOD

[75] Inventors: Tsutomu Tanaka, Nishinomiya; Hiroshi Yokota; Kouji Kubota, both of Osaka, all of Japan

[73] Assignee: Matsushita Electric Industrial Co., Ltd., Osaka, Japan

[21] Appl. No.: 937,480

[22] Filed: Aug. 28, 1992

[30] Foreign Application Priority Data

Aug. 28, 1991 [JP] Japan .................. 3-217143
May 22, 1992 [JP] Japan .................. 4-131125

[51] Int. Cl.⁵ .................................. H04L 12/56
[52] U.S. Cl. .................. 370/85.15; 370/16.1; 370/85.7; 370/85.12; 370/60; 370/60.1; 370/94.1
[58] Field of Search ............ 370/16.1, 85.7, 85.12, 370/85.15, 60, 60.1, 94.1

[56] References Cited

U.S. PATENT DOCUMENTS 5,008,663  4/1991  Adams ................. 370/85.7 X
5,150,356  9/1992  Tsutsui ................ 370/16.1
5,163,045  11/1992  Caram et al. .......... 370/60.1

OTHER PUBLICATIONS

ATM Ring Protocoland Performance, by H. Ohnishi et al., IEEE ICC '89, Jun. 1989.

Primary Examiner—Douglas W. Olms
Assistant Examiner—Russell W. Blum
Attorney, Agent, or Firm—Price, Gess & Ubell

[57] ABSTRACT

A packet communications network for transmitting data between nodes by the use of cell slots circulating the network includes a center node inserted in the ring network for sequentially generating, at a selected rate, first and second types of cell slots interleavingly for transmitting first and second types of data, respectively. Each cell slot has a type code for identifying either one of the first and second types, and a status code for identifying the different status of the cells. Each node detects whether the received cell is the first type or the second type. If the received cell is the first type, it is used for transmitting the connection-oriented data under MARS system. If the received cell is the second type, it is used for transmitting the connectionless data under ATMR system.

12 Claims, 8 Drawing Sheets

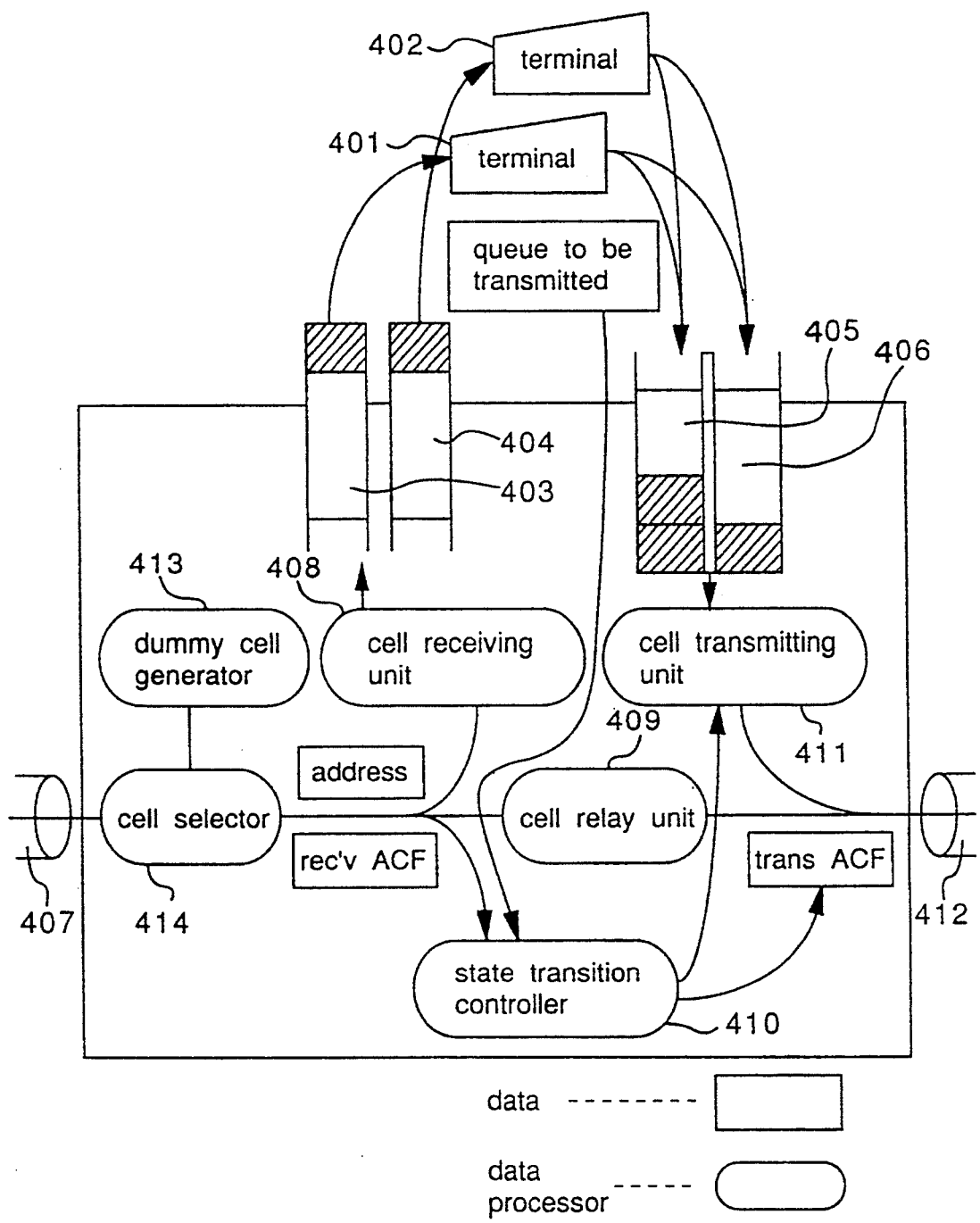

FIG. 5

| CASE | STATE OF RECEIVED CELLS | ADDRESSEE | EXTRACTION | CELL STATE AFTER CELL RELAY UNIT | WINDOWS | LENGTH OF QUEUE | CELL DISPATCHER | REMAINING W | REMAINING Q | STATE OF SENDING CELL |
|---|---|---|---|---|---|---|---|---|---|---|
| 1-a | OCCUPIED | OTHER NODE | NO | OCCUPIED | OPEN W>0 | Q>0 | RELAY UNIT | W | Q | OCCUPIED |
| 1-b | OCCUPIED | RECEIVED-NODE | YES | IDLE | OPEN W>0 | Q>0 | TRANSMITTING UNIT | W−1 | Q−1 | OCCUPIED |
| 1-c | IDLE | RECEIVED-NODE | NO | RELEASED | OPEN W>0 | Q>0 | TRANSMIT. UNIT | W−1 | Q−1 | OCCUPIED |
| 1-d | IDLE | OTHER NODE | NO | OCCUPIED | OPEN W>0 | Q>0 | RELAY UNIT | W | 0 | OCCUPIED |
| 1-e | RELEASED | RECEIVED-NODE | NO | IDLE | OPEN W>0 | Q>0 | TRANSMITTING UNIT | W−1 | 0 | RELEASED BOUND FOR RECEIVED-NODE |
| 1-f | RELEASED | OTHER NODE | NO | RELEASED | OPEN W>0 | Q>0 | RELAY UNIT | W | Q | RELEASED |
| 2-a | OCCUPIED | OTHER NODE | NO | OCCUPIED | OPEN W>0 | Q=0 | RELAY UNIT | W | 0 | OCCUPIED |
| 2-b | OCCUPIED | RECEIVED-NODE | YES | IDLE | OPEN W>0 | Q=0 | RELAY UNIT | W | Q | OCCUPIED |
| 2-c | IDLE | RECEIVED-NODE | NO | IDLE | OPEN W>0 | Q=0 | TRANSMIT. UNIT | W−1 | 0 | OCCUPIED |
| 2-d | IDLE | OTHER NODE | NO | RELEASED | OPEN W>0 | Q=0 | RELAY UNIT | W | 0 | OCCUPIED |
| 2-e | RELEASE | RECEIVED-NODE | NO | OCCUPIED | OPEN W>0 | Q=0 | | | | |
| 2-f | OCCUPIED | OTHER NODE | NO | IDLE | CLOSED W=0 | Q>0 | RELAY UNIT | 0 | Q | IDLE |
| 3-a | OCCUPIED | RECEIVED-NODE | YES | | CLOSED W=0 | Q>0 | RELAY UNIT | 0 | Q | IDLE |
| 3-b | IDLE | OTHER NODE | NO | IDLE | CLOSED W=0 | Q>0 | RELAY UNIT | 0 | Q | IDLE |
| 3-c | IDLE | OTHER NODE | NO | RELEASED | CLOSED W=0 | Q>0 | | | | |
| 3-d | RELEASE | OTHER NODE | NO | OCCUPIED | CLOSED W=0 | Q>0 | TRANSMIT. UNIT | 0 | Q−1 | OCCUPIED |
| 3-a | OCCUPIED | RECEIVED-NODE | YES | IDLE | CLOSED W=0 | Q=0 | RELAY UNIT | 0 | 0 | OCCUPIED |
| 3-b | | | | | | | | | | |
| 3-c | IDLE | RECEIVED-NODE | NO | | CLOSED W=0 | Q=0 | RELAY UNIT | 0 | 0 | IDLE |
| 3-d | IDLE | OTHER NODE | NO | | CLOSED W=0 | Q=0 | | | | |
| 3-e | RELEASED | RECEIVED-NODE | NO | | CLOSED W=0 | Q=0 | RELAY UNIT | 0 | 0 | RELEASED |
| 3-f | RELEASED | OTHER NODE | NO | RELEASED | CLOSED W=0 | Q=0 | | | | |

PACKET COMMUNICATIONS NETWORK AND COMMUNICATIONS METHOD

BACKGROUND OF THE INVENTION

1. Field of the Invention

The present invention relates to an ATM (asynchronous transfer mode) ring network for standardized communication of multimedia information, and specifically to a ring packet communications network and communications method enabling data transfer between any selected communications nodes by transmitting cell slots on a data path having plural communications nodes.

2. Description of the Related Art

The data transmission ring network systems which the present invention can be applied are the ATMR system and the MARS system.

The ATMR system is a known system and is disclosed in "ATM RING PROTOCOL AND PERFORMANCE" (H. Ohnishi et al. CH2655-9/89/0000-0394 1989 IEEE) or in "Studies in the construction of subscriber-accessible high-speed ring networks (ATMR)" (Ito, et al.:Switching Systems Engineering, IEICE Technical Report, SSE 90-41).

The MARS system is a new system (publicly unknown as of Aug. 28, 1992) with a packet transmission ring network format and is invented by Tsutomu Tanaka and Hiroshi Yokota who are the co-inventors of the present invention and disclosed in Japanese Patent application No. 3-107802 (corresponding to U.S. Patent application Ser. No. 07/882608 and to Canadian Patent application No. 2,077,027-9) assigned to the same assignee as the present application.

First, the ATMR system is described below with reference to FIG. 6.

ATMR is a distributed node system with plural access nodes (AN; hereinafter "node") connected in a ring topology by a pair of transmission paths carrying data in opposite directions. Each access cell AN is connected with one or more terminals. Data are transmitted and received between terminals by ATMR cell slots circulating around the transmission ring via ANs. The ATMR cell consists of a binary digit string having a format shown in FIG. 7. The format is composed of a 12 bit access control field (ACF), a 16 bit ring virtual channel number (RVCN) comprising an access node address (ANA) and a logical channel number (LCN), 4 bit undefined bits, an 8 bit header check sequence and the user information of 48 octets carrying the contents of data.

A network controller is connected to one of the access nodes to continuously circulate a train of ATMR cell slots around the ring at the rate of, e.g., 1400 kilo cell slots per second. Each access node AN has its own share of cell slots that can be used for sending data from that access node to another access node per a predetermined unit time, such as one second.

In the above example, if there are 70 access nodes and if the share is even, each access node is permitted to use 20 kilo cell slots per second. Such a permitted number of cell slots that can be used per a unit time is referred to as a band. Each time an access node uses an empty idle cell slot for sending data from that node to another node, a share counter provided in that access node is decremented to keep the record of number of available cell slots that can be used by that access node.

If an access node has not used any cell slot for sending data, it is so stated that a window (or windowing size) of that access node is fully opened. If an access node has used some cell slots within the permitted number of cell slots, it is so stated that a window is partly closed. If an access node has used all the permitted cell slots, i.e., all its share, it is so stated that a window is closed.

The access control field (ACF) is needed to make the ATMR system compatible with multimedia communications, assuring fair cell access ("fairness") between the nodes, and playing a critical role determining overall system performance. The ACF will be further described below.

Assuring fairness is achieved by the window size set for each node. Any node that has used all the permitted cell slots for sending data from one of the communications terminals, a window of that access node closes to stop further cell transmissions (waives its transmission right) until all nodes have completed transmitting full window size cells.

According to the ATMR system, the node is either in the active state in which the window is still open and there are some data waiting for being sent, or the inactive state in which the window is closed or the window is still open but their is no data for sending.

When the node is in the active state, it overwrites its address in the address control field (ACF) of the cell slot that passes through the node. When the node is in the inactive state, the node will not overwrite its address.

When the node in the inactive state receives a cell slot with its address overwritten in the address control field (ACF), it is understood that all the other nodes are in the inactive state. In this case, the node generates a "reset cell" and, at the same time, initialize the window size, and is changed to an hunt state. When the node in the hunt state receives the "reset cell", the cell is changed to unoccupied cell, and the hunt state is cleared.

The window size is also defined according to the different media types, and consumption of the window size is prioritized by communications class so that those cell slots permitting the least delay in the node are transmitted first.

FIG. 8 shows each access node which has various functional elements for accomplishing the access control. The access node has reception ring 801, cell reception transfer unit 802, input buffer 803, communications terminal 804, plural output buffers 805 provided for each priority class, cell transmitting unit 806, cell relay unit 807, state change controller 808, and transmission ring 809. The cell relay unit is also referred to as a cell shifting unit.

The cell reception and transfer function is described first. When a cell slot is received from the reception ring 801, the RVCN (ANA+LCN) written to the cell header is interpreted by the cell reception transfer unit 802. If it is determined that the cell slot is addressed to the communications terminal 804 connected to that access node AN, the cell slot is input to the input buffer 803 and transferred to the communications terminal 804, so that the cell slot is emptied.

The cell relay function is described next. In order to improve the ring utilization rate in an ATMR, the addressed node releases the emptied cell slot so that any nodes following that addressed node can reuse the emptied cell slot. The cell address is defined in the access node address (ANA) of the cell header. As a result, when the ANA of the received cell slot matches the address of the node to which the cell slot was received, that node empties the cell, but all other nodes (i.e., the unaddressed nodes) will simply throughput the cell to the next node from the cell relay unit 807. Because the cell slots can be quickly reused in this ATMR system, the total throughput of the network is improved.

The cell transmission function is described next. Distributed control of communications for all nodes using the access control field information (ACF) in the cell header is used in the ATMR system. Each node provides state transition processing based on the ACF in the received cell, and the number of transmission wait-state cells, remaining window size, the cell transmission delay quality assurance timer count and other internal node states, and the empty base information in the received cell. Transmission of relay cells or transmission wait-state cells over the ring is then controlled based on the results of this state transition processing. The cell slots transmitted from the communications terminal 804 are then stored in the output buffers 805 in order of priority. When the cell slots can be transmitted as determined by the results returned from the state transition controller 808, they are output to the transmission ring 809.

In a network environment in which constant bit rate (CBR) data and variable bit rate (VBR) data are both used, window control and reset control as applied in the ATMR cannot be used to completely control CBR data due to the intolerance of CBR data transmissions for variations in the delay time. CBR data is therefore transmitted using cell reservation communications method.

Cell reservation communications consists of a cell reservation phase and a cell use phase.

In the cell reservation phase the communications terminal issues a request to transmit N cell slots of CBR data each time period T, and the node then reserves N cell slots in time T for the transmitted cell slots. The reservation is made by writing the reservation bit and the address of the node making the reservation to the ACF. When the reserved cell slot is emptied by another node to allow reuse, the reservation bit set in the ACF prevents the other nodes from using it, and the cell slot is therefore returned to the node making the reservation. This continues until reservation polling is stopped.

The ATMR is therefore able to distribute band processing according to the window size assigned to each node, thus maintaining fairness in communications between nodes.

When the reserved cell comes back around to the node making the reservation, the node recognizes that the cell can be used from the reservation bit set in the ACF and the reserving node address (i.e., its own address) in the ANA, and then transmits the reservation communications cell in the cell use phase.

Next, the MARS system is described. The MARS system employs the structure shown in FIG. 1.

Plural nodes 103-106 are networked in a ring topology using a pair of transmissions paths that transmit data in opposite directions. Plural communications terminals may be connected to each node. Fixed length cell slots, or train of cells, are sent around the ring.

As shown in FIG. 2, each cell slot comprises a 5-byte header and a 48-byte payload area for user data. The 5-byte header contains the node number of the addressee (address of the destination node), and a declaration bit indicating whether the cell slot is in an idle state, use state, or released state.

It is assumed in the following description that data from one terminal 101 is being transmitted to another terminal 102. The transmitted data is processed as a cell of fixed length. To transmit the data, the terminal 101 informs the network controller 107 of the band size needed to transmit the data, and requests ring access (polling). The network controller 107 determines whether the request can be accepted based on the current state of ring usage, the band capacity already allocated to the node, and other parameters. If the request is accepted, the network controller 107 assigns the required band capacity to the next node 104. In this manner, the share of the cells for each node is determined, and the share counter, which is a down counter, is set to the allocated number of cells. Each node can transmit data using the cell slots traveling around the ring according to the assigned band size, i.e., according to the number of cells allocated to the cell.

The terms "band" and "window" used above for the ATMR system are also used for the MARS system. Thus, when the number of cells used by a node for transmitting the data is less than the number of cells that can be used as determined by the allocated band, the node window is said to be opened. When the node uses all the cells determined by the allocated band, the window is said to be closed.

The operation of each part of the node is described below with reference to FIG. 4.

There are three possible states each cell can take while traveling around the ring: idle, occupied, and released. These are described below.

(1) Idle state: An idle cell is an empty cell slot which is neither being occupied nor released. When an idle cell slot reaches any node with remaining usable band capacity (the window is open), that node can use the cell slot to transmit data over the ring. For each cell used, the remaining allocated band capacity is decreased by decrementing the share counter by one.

(2) Occupied: An occupied state cell is a cell currently being used to send data over the ring. When an occupied cell slot reaches a node, the node interprets the header to determine the addressed node. If the addressee is a different node, the cell slot is relayed directly through. If the addressee is the present node, the data is extracted and the emptied cell slot is thereafter treated as an idle cell slot.

(3) Released: A released cell is an empty cell which is released for use in any access node that has a data to be transmitted, and yet effecting no decrement of the share counter in the access node which has used the released cell. A released cell is formed as follows. If a node which has not used all the share of the allotted cells, but has no data to send receives an idle cell slot or occupied state cell but emptied in that node, that node writes its own address to the address control field (ACF) in the received cell and, at the same time, it gives an indication that the cell is a released cell slot. While the released cell slot is circulated along the ring network, any access node that has a data to be transmitted can use the released cell slot for sending data to another access node. In this case, the access node that uses the released cell slot does not decrement the share counter. Thus, even the node with the closed window can use the released cell slot to send more data.

Referring to FIG. 4, reception buffers 403 and 404 and transmission buffers 405 and 406 are respectively provided for the communications terminals 401 and 402 connected to the node. The node is connected to other nodes in the network by the reception ring 407 and transmission ring 412.

The cell receiving unit 408 reads the header in each cell slot arriving from the reception ring 407. If the received cell is the occupied cell, and is addressed to a communications terminal connected to that node, the receiving unit 408 extracts the data stored in the payload of the cell slot. The extracted data is input to one of the reception buffers 403, 404.

The cell relay unit 409 reads the addressee and the state of the cell slots arriving from the reception ring 407 and performs one of several conditional operations. Specifically, (a) if the received cell slot is addressed to that node and is the occupied cell, the cell slot is reset to an idle state;
(b) if the received cell slot is addressed to another node, it is left unchanged so that the present state is maintained;
(c) if the received cell slot is the idle cell, the cell slot is left unchanged;
(d) if the received cell slot is the released cell and is addressed to that node, the cell slot is returned back to the idle cell; and
(e) if the received cell slot is the released cell, but is addressed to another node, it is left unchanged in the present state.

The state transition controller 410 determines whether to send out the cell to the transmission ring 412 from the cell relay unit 409 or from the cell transmitting unit 411. The cell is sent out to the transmission ring 412 from the cell relay unit 409: (i) when the occupied cell which is addressed to some other node is received; (ii) when the released cell addressed to some other node is received while having no data to be transmitted; or (iii) when the idle cell is received while the window is closed. On the other hand, the cell is sent out from the cell transmitting unit 411: (i) when the idle cell is received while the window is open (in this case, the sent out cell will be either in occupied state or in released state); or (ii) when the released cell addressed to some other node is received while having some data to be transmitted.

The operation of the access node shown in FIG. 4 is summarized in a table shown in FIG. 5, in which possible cases under different conditions (1)-(4) are shown. For the sake of brevity, only a number of cases in different conditions are explained.

Condition (1): The node condition is such that the window is open and there are some data in the transmission buffer 405 or 406 waiting for the transmission.

Case (1-a): The received cell is the occupied cell, and the addressee is to some other node. Thus, no data is extracted. The cell state after the cell relay unit 409 remains the same, i.e., the occupied cell. The window is opened (W>0), meaning that the share to use the cell is still left. The queue number Q of data in the buffer 405 or 406 is greater than zero, meaning that there are some data in the buffer 405 or 406 waiting for the transmission. The cell will be dispatched to transmission ring 412 from the cell relay unit 409. Since the received cell is already occupied, this cell can not be used by this node. Thus, the share counter remains unchanged, and also the queue number Q remains unchanged. The cell sent out from the transmission ring 412 will be in the occupied state.

Case (1-b): The received cell is the occupied cell, and the addressee is to this node. Thus, data from the cell is extracted so that the cell is emptied. The cell state after the cell relay unit 409 is changed to idle condition. The window is opened (W>0). The queue number Q of data in the buffer 405 or 406 is greater than zero, meaning that there are some data in the buffer 405 or 406 waiting for the transmission. The cell will be dispatched to transmission ring 412 from the cell transmitting unit 411. More specifically, the state transition controller 410 outputs a cell transmission command to the cell transmitting unit 411. This command causes the cell transmitting unit 411 to read cells from the beginning of the transmission buffer, write them to the cells of the current cell slot, write the addressee node number to the header, and then transmit the cell slot to the transmission ring 412. The data in the buffer 405 or 406 is shifted to the payload area in the cell for the transmission. Thus, the share counter is decremented, and also the queue number Q is decremented. The cell sent out from the transmission ring 412 will be in the occupied state.

Case (1-c): The received cell is the idle cell, and the addressee is to this node. No data extraction takes place. The cell state after the cell relay unit 409 is maintained to idle condition. The window is opened (W>0). The queue number Q of data in the buffer 405 or 406 is greater than zero, meaning that there are some data in the buffer 405 or 406 waiting for the transmission. The cell will be dispatched to transmission ring 412 from the cell transmitting unit 411. The data in the buffer 405 or 406 is shifted to the idle cell for the transmission. Thus, the share counter is decremented, and also the queue number Q is decremented. The cell sent out from the transmission ring 412 will be in the occupied state.

Case (1-d): Similar to Case (1-c).

Case (1-e): The received cell is the released cell, and the addressee is to this node. No data extraction takes place. Since the released cell has made one complete turn in the ring network, the cell state after the cell relay unit 409 is changed to idle condition. The window is opened (W>0). The queue number Q of data in the buffer 405 or 406 is greater than zero, meaning that there are some data in the buffer 405 or 406 waiting for the transmission. The cell will be dispatched to transmission ring 412 from the cell transmitting unit 411. The data in the buffer 405 or 406 is shifted to the idle cell for the transmission. Thus, the share counter is decremented, and also the queue number Q is decremented. The cell sent out from the transmission ring 412 will be in the occupied state.

Case (1-f): The received cell is the released cell, and the addressee is to some other node. No data extraction takes place. The cell state after the cell relay unit 409 is maintained as the released cell. The window is opened (W>0). The queue number Q of data in the buffer 405 or 406 is greater than zero, meaning that there are some data in the buffer 405 or 406 waiting for the transmission. The cell will be dispatched to transmission ring 412 from the cell transmitting unit 411. The data in the buffer 405 or 406 is shifted to the released cell for the transmission. In this case, the share counter will not be decremented, because it has been already decremented in the other node which generated this released cell. The queue number Q is decremented. The cell sent out from the transmission ring 412 will be in the occupied state.

Condition (2): The node condition is such that the window is open, but there is no data in the transmission buffer 405 or 406.

- Case (2-a): The received cell is the occupied cell, and the addressee is to some other node. Thus, no data is extracted. The cell state after the cell relay unit 409 remains the same, i.e., the occupied cell. The window is opened (W>0), meaning that the share to use the cell is still left. The queue number Q of data in the buffer 405 or 406 is zero, meaning that there is no data in the buffer 405 or 406. The cell will be dispatched to transmission ring 412 from the cell relay unit 409. The cell sent out from the transmission ring 412 will be in the occupied state.
- Case (2-b): The received cell is the occupied cell, and the addressee is to this node. Thus, data from the cell is extracted so that the cell is emptied. The cell state after the cell relay unit 409 is changed to idle condition. The window is opened (W>0). The queue number Q of data in the buffer 405 or 406 is zero, meaning that there is no data in the buffer 405 or 406. The cell will be dispatched to transmission ring 412 from the cell transmitting unit 411. More specifically, the state transition controller 410 outputs a cell transmission command to the cell transmitting unit 411. This command causes the cell transmitting unit 411 to set the address of the cell to this node, and to sets the cell slot state to released. Thus, the released cell is sent out from the transmission ring 412. By this command, the rights to use the cell by this node are waived, so that the right to use that cell is passed to another node that has some data to transmit. Since the right to use the cell by this node is waived, the share counter is decremented. The queue number Q is maintained zero. The cell sent out from the transmission ring 412 will be in the released state.
- Case (2-c): The received cell is the idle cell, and the addressee is to this node. No data extraction takes place. The cell state after the cell relay unit 409 is maintained to idle condition. The window is opened (W>0). The queue number Q of data in the buffer 405 or 406 is zero. The cell will be dispatched to transmission ring 412 from the cell transmitting unit 411. The state transition controller 410 commands cell transmitting unit 411 to make a released cell. The share counter is decremented, and the queue number Q is maintained zero. The cell sent out from the transmission ring 412 will be in the released state.
- Case (2-d): Similar to Case (2-c).
- Case (2-e): The received cell is the released cell, and the addressee is to this node. No data extraction takes place. Since the released cell has made one complete turn in the ring network, the cell state after the cell relay unit 409 is changed to idle condition. The window is opened (W>0). The queue number Q of data in the buffer 405 or 406 is zero. A released cell will be dispatched to transmission ring 412 from the cell transmitting unit 411. Thus, the share counter is decremented. The queue number Q is maintained zero. The cell sent out from the transmission ring 412 will be in the released state.
- Case (2-f): The received cell is the released cell, and the addressee is to some other node. No data extraction takes place. The cell state after the cell relay unit 409 is maintained as the released cell. The window is opened (W>0). The queue number Q of data in the buffer 405 or 406 is zero. The cell will be dispatched to transmission ring 412 from the cell relay unit 409. The share counter will not be decremented. The queue number Q is maintained zero. The cell sent out from the transmission ring 412 will be in the released state.

Condition (3): The node condition is such that the window is closed, but there are some data in the transmission buffer 405 or 406.

- Case (3-a): The received cell is the occupied cell, and the addressee is to some other node. Thus, no data is extracted. The cell state after the cell relay unit 409 remains the same, i.e., the occupied cell. The window is closed (W=0), meaning that the share to use the cell is no more left. The queue number Q of data in the buffer 405 or 406 is greater than zero, meaning that there are some data in the buffer 405 or 406. The cell will be dispatched to transmission ring 412 from the cell relay unit 409. The cell sent out from the transmission ring 412 will be in the occupied state.
- Case (3-b): The received cell is the occupied cell, and the addressee is to this node. Thus, data from the cell is extracted so that the cell is emptied. The cell state after the cell relay unit 409 is changed to idle condition. The window is closed (W=0). The queue number Q of data in the buffer 405 or 406 is greater than zero, meaning that there are some data in the buffer 405 or 406. The cell will be dispatched to transmission ring 412 from the cell relay unit 409. The share counter is maintained zero, and the queue number Q is maintained Q. The cell sent out from the transmission ring 412 will be in the idle state.
- Case (3-c): The received cell is the idle cell, and the addressee is to this node. No data extraction takes place. The cell state after the cell relay unit 409 is maintained to idle condition. The window is closed (W=0). The queue number Q of data in the buffer 405 or 406 is greater than zero. The cell will be dispatched to transmission ring 412 from the cell relay unit 409. The share counter is maintained zero, and the queue number Q is maintained Q. The cell sent out from the transmission ring 412 will be in the idle state.
- Case (3-d): Similar to Case (3-c).
- Case (3-e): The received cell is the released cell, and the addressee is to this node. No data extraction takes place. Since the released cell has made one complete turn in the ring network, the cell state after the cell relay unit 409 is changed to idle condition. The window is closed (W=0). The queue number Q of data in the buffer 405 or 406 is greater than zero. The idle cell will be dispatched to transmission ring 412 from the cell relay unit 409. The share counter is maintained zero and the queue number Q is maintained to Q. The cell sent out from the transmission ring 412 will be in the idle state.
- Case (3-f): The received cell is the released cell, and the addressee is to some other node. No data extraction takes place. The cell state after the cell relay unit 409 is maintained as the released cell. The window is closed (W=0). The queue number Q of data in the buffer 405 or 406 is greater than zero so that the data in the buffer 405 or 406 is shifted to the released cell for the transmission. The cell will be dispatched to transmission ring 412 from the cell transmitting unit 411. The share counter will be maintained zero and, the queue number Q is decremented. The cell sent out from the transmission ring 412 will be in the occupied state.

Condition (4): The node condition is such that the window is closed, and there is no data in the transmission buffer 405 or 406.

Case (4-a): The received cell is the occupied cell, and the addressee is to some other node. Thus, no data is extracted. The cell state after the cell relay unit 409 remains the same, i.e., the occupied cell. The window is closed (W=0), meaning that the share to use the cell is no more left. The queue number Q of data in the buffer 405 or 406 is zero. The cell will be dispatched to transmission ring 412 from the cell relay unit 409. The cell sent out from the transmission ring 412 will be in the occupied state.

Case (4-b): The received cell is the occupied cell, and the addressee is to this node. Thus, data from the cell is extracted so that the cell is emptied. The cell state after the cell relay unit 409 is changed to idle condition. The window is closed (W=0). The queue number Q of data in the buffer 405 or 406 is zero. The cell will be dispatched to transmission ring 412 from the cell relay unit 409. The share counter is maintained zero, and the queue number Q is maintained zero. The cell sent out from the transmission ring 412 will be in the idle state.

Case (4-c): The received cell is the idle cell, and the addressee is to this node. No data extraction takes place. The cell state after the cell relay unit 409 is maintained to idle condition. The window is closed (W=0). The queue number Q of data in the buffer 405 or 406 is zero. The cell will be dispatched to transmission ring 412 from the cell relay unit 409. The share counter is maintained zero, and the queue number Q is maintained zero. The cell sent out from the transmission ring 412 will be in the idle state.

Case (4-d): Similar to Case (4-c).

Case (4-e): The received cell is the released cell, and the addressee is to this node. No data extraction takes place. Since the released cell has made one complete turn in the ring network, the cell state after the cell relay unit 409 is changed to idle condition. The window is closed (W=0). The queue number Q of data in the buffer 405 or 406 is zero. The idle cell will be dispatched to transmission ring 412 from the cell relay unit 409. The share counter is maintained zero and the queue number Q is maintained zero. The cell sent out from the transmission ring 412 will be in the idle state.

Case (4-f): The received cell is the released cell, and the addressee is to some other node. No data extraction takes place. The cell state after the cell relay unit 409 is maintained as the released cell. The window is closed (W=0). The queue number Q of data in the buffer 405 or 406 is zero. The cell will be dispatched to transmission ring 412 from the cell relay unit 409. The share counter will be maintained zero and, the queue number Q is maintained zero. The cell sent out from the transmission ring 412 will be in the released state.

Based on the command from the state transition controller 410, the cell transmitting unit 411 reads cells from the beginning of the transmission buffers 405 and 406, which are assigned a priority rating. The data to be transmitted is written in the payload area of the cell slot. Then the cell slot is transmitted to the transmission ring 412.

The operation of the dummy cell generator 413 and cell selector 414 will be described later together with the error recovery operation.

As described above, according to the MARS system, cells can be transmitted from the transmission buffer using released state cell slots or the idle cell slots when the window is open. It is thus possible to increase the cell transmission efficiency, and to avoid deterioration of communications quality resulting from cell loss caused by buffer overflows, transmission time delays (time-outs), and other factors.

To improve network reliability in the ATMR system, MARS system, or any other ring network system, two ring transmission paths are used so that when transmission path faults occur, a current-use standby switching or a loop-back control takes place to revive the system until the faults are mended.

The current-use standby switching is a technique to use a back-up transmission path when one of the two transmission lines breaks. Normally, only one of the two transmission paths is used and the second path is reserved as a back-up transmission path. When an error occurs on the normally used path, the system is switched to use the back-up transmission path.

The loop-back control is a technique to use both the normal transmission path and the back-up transmission path when a break down takes place between two nodes in both of the normal transmission path and the back-up transmission path. When both paths of the ring break down between two nodes, the normal transmission path and the back-up transmission path are mutually connected at said two nodes to establish a ring network so that the communications can be maintained by reflecting the transmission back from the nodes at both ends of the broken ring.

To prevent even momentary breaks when either current-use standby switching or loop-back control is applied in the MARS system, a dummy cell generator 413 provided in each node is activated.

Referring again to FIG. 4, the operation of the dummy cell generator 413 and cell selector 414 is described below.

When the dummy cell generator 413 is activated, it generates idle cells. When a transmission path error occurs, cells do not reach the cell receiving means (not shown in the figure) in the reception ring 407. If cells are not detected for a predetermined period of time by the cell receiving means, a control layer unit (also not shown in the figures) determines that a transmission path error have occurred, and generates an error occurring signal. In response to the error occurring signal, the dummy cell generator 413 is activated to output a dummy cell, and the cell selector 414 operates thereafter to input the cells generated by the dummy cell generator 413 to the cell receiving unit 408 and cell relay unit 409.

The dummy cell is generated with an idle state. When the cell receiving unit 408 detects a dummy cell, it concludes that there are no transmission cells (occupied state cells) from upstream nodes. Thus, all cells generated by the dummy cell generator 413 are input to the cell relay unit 409. Data can therefore be transmitted from the transmission buffer 405, 406 because the cell relay unit 409 treats the dummy cells as normal idle cells. As a result, even if the transmission path on the reception ring 407 side of the node breaks down, communications between that node and downstream nodes, as well as any nodes not connected through the interrupted transmission path, can be maintained.

The ATMR system and MARS system have their own superiorities and inferiorities.

According to the ATMR system, it provides a high level of fairness and attains a high throughput rate. However, there are also some problems in the ATMR system.

Consider the case in which no data is sent from any of the nodes in the ATMR system. The cells traveling around the ring are either empty or reset cells. If suddenly data transmission is started from one of the nodes (e.g., node M), that node can send data continuously up to the window size. Since all cells output from node M will be occupied state cells, no usable cells will pass the nodes between node M and the destination (addressee) node once the node M begins transmission. This means, of course, that no node between the sending and receiving nodes will be able to send data over the network. Transmission is therefore forced to wait while the node M transmission is in progress, and the transmission delay increases. Once the node M transmission ends, priority will pass to the node closest to node M, and the fairness between nodes will not be maintained.

As also described, cell reservation communications is introduced to mixed CBR and VBR data networks under ATMR to maintain CBR data transmission integrity. With this format, however, a cell reservation phase is required after network polling before actual data transmission can begin. This phase also has the potential for increasing the cell transmission delay time. In addition, because the reserved cells cannot be used by any other node, the utilization rate of the network may also drop.

According to the MARS system, a released state cell slot is introduced so that the nodes negotiate for use of the unoccupied portion of the band allotted to each node, effectively increasing the utilization rate of the ring and improving the cell transmission delay time. However, the following problems are also presented in the MARS system.

Specifically, the released state cell slots can be used freely by any of the nodes. In other words, (1) a node that has consumed its allotted band but still has data to send can use the released state cell slots to continue transmission, and (2) any node that has not used its allotted band can also use the released state cell slots to send data without using its own allotted band.

In other words, the MARS system is optimized for compatibility with communications (connection-oriented communications) in which access polling precedes data sending and uses band allocation. In this type of ring network, however, it is also necessary to assure sufficient consideration for communications between computers and other connectionless communications. In connectionless communications, data is not transmitted at any regular cycle, large volumes of data are produced in a short period of time (burst communications), and polling does not precede the start of data transmission. If connectionless communications is accommodated in the MARS system, a certain band capacity could be allocated to the node. Connectionless data is generated at sudden, unpredictable times, however, temporarily using a large number of released state cell slots and possibly disrupting distributed management of the band capacity between nodes.

Errors could therefore be introduced to connection-oriented communications, and the quality required for the different transmission modes may not be maintained.

SUMMARY OF THE INVENTION

The object of the present invention is therefore to provide a ring network that assures fairness between nodes, increases the utilization rate of the overall system and transmits data efficiently, and can easily adapt to faults in the network in a mixed CBR/VBR data environment enabling both connection-oriented and connectionless communications.

To achieve this object, a packet communications network for transmitting data between nodes by the use of cell slots circulating the network comprises: plural nodes connected in a ring network; a network controller connected to one of the nodes for allocating the number of usable cell slots per unit time to each node; center node inserted in the ring network for sequentially generating, at a selected rate, first and second types of cell slots for transmitting first and second types of data, respectively, each cell slot having a type code for identifying either one of the first and second types, and a status code for identifying, when the cell slot is the first type, any one of an idle state, an occupied state and a released state, and for identifying, when the cell slot is the second type, either the cell is an unoccupied cell, occupied cell or a reset cell; and each of the plural nodes comprising: address detection means for detecting whether the addressee is to the received node or to any other node; type detection means for detecting whether the received cell is the first type or the second type; status detection means for detecting, when the received cell is the first type, whether the received cell is in the idle state, the occupied state or the released state, and for detecting, when the received cell is the second type, whether the received cell is the unoccupied cell, the occupied cell or the reset cell; data putting means for putting, when the received cell is the first type, data on the cell slot which is in either one of the idle state and released state, and for putting, when the received cell is the second type, data on the unoccupied cell slot; status transition means for changing, when the received cell is the first type, the status of the received cell from idle to occupied if the node puts data to the received cell, from idle to released if the node waives its right to use the cell slot, or from released to idle if the released cell makes one complete turn around the ring network without being used by other nodes.

According to a preferred embodiment, in the packet communications network, each of the plural nodes further comprises first buffer means for storing first type data to be transmitted by the first type cells and second buffer means for storing second type data to be transmitted by the second type cells.

According to a preferred embodiment, in the packet communications network, the first type data is a connection-oriented data, and the second type data is a connectionless data.

According to a preferred embodiment, the packet communications network further comprises dummy cell generating means for sequentially generating, at the selected rate, the first and second types of cell slots when a network transmission path fault occurs in a path upstream of the node.

According to a preferred embodiment, in the packet communications network, the dummy cell generating means generates the first type cell slots in the idle status, and the second type cell slots in a repetition of one reset cell and a predetermined number of unoccupied cells, and the first type cell slots and the second type cell slots being interleaved in a predetermined ratio.

According to a preferred embodiment, in the packet communications network, the ring is doubled.

Furthermore, according to the present invention, a method for transmitting data between nodes in a packet communications network by the use of cell slots circulating the network comprises the step of: sequentially generating from the center node at a selected rate, first and second types of cell slots for transmitting first and second types of data, respectively, each cell slot having a type code for identifying either one of the first and second types, and a status code for identifying, when the cell slot is the first type, any one of an idle state, an occupied state and a released state, and for identifying, when the cell slot is the second type, either the cell is an unoccupied cell, an occupied cell or a reset cell; and in each of the plural nodes, the method comprises: detecting whether the addressee is to the received node or to any other node; detecting whether the received cell is the first type or the second type; detecting, when the received cell is the first type, whether the received cell is in the idle state; the occupied state or the released state; detecting, when the received cell is the second type, whether the received cell is the unoccupied cell, the occupied cell or the reset cell; putting, when the received cell is the first type, data on the cell slot which is in either one of the idle state and released state; putting, when the received cell is the second type, data on the unoccupied cell slot; and changing, when the received cell is the first type, the status of the received cell from idle to occupied if the node puts data to the received cell, from idle to released if the node waives its right to use the cell slot, or from released to idle if the released cell makes one complete turn around the ring network without being used by other nodes.

BRIEF DESCRIPTION OF THE DRAWINGS

The present invention will become more fully understood from the detailed description given below and the accompanying diagrams wherein:

FIG. 4 is a block diagram of the node functions according to the MARS system;

FIG. 5 is a table used to describe the ring access operation of the MARS system;

DESCRIPTION OF THE PREFERRED EMBODIMENTS

The preferred embodiment of a ring network and packet communications method according to the present invention is described below with reference to the accompanying figures. The structure of the ring network is described first with reference to FIG. 1.

This network comprises a network controller 107 and communications terminals 101 and 102 connected to network nodes 103–106. The network controller 107 controls the bands and other aspects of the ring network. Fixed-length cell slots (packets) travel the transmission paths linking the nodes 103–106. Data from any of the nodes is transmitted using these cell slots. According to the present invention, the ring network accepts two types of cell slots: the first type (type 1) is for sending connection-oriented data which requires a call setting before communications begins; and the second type (type 2) is for sending connectionless data such as used for sending data between computers.

Figure 2:
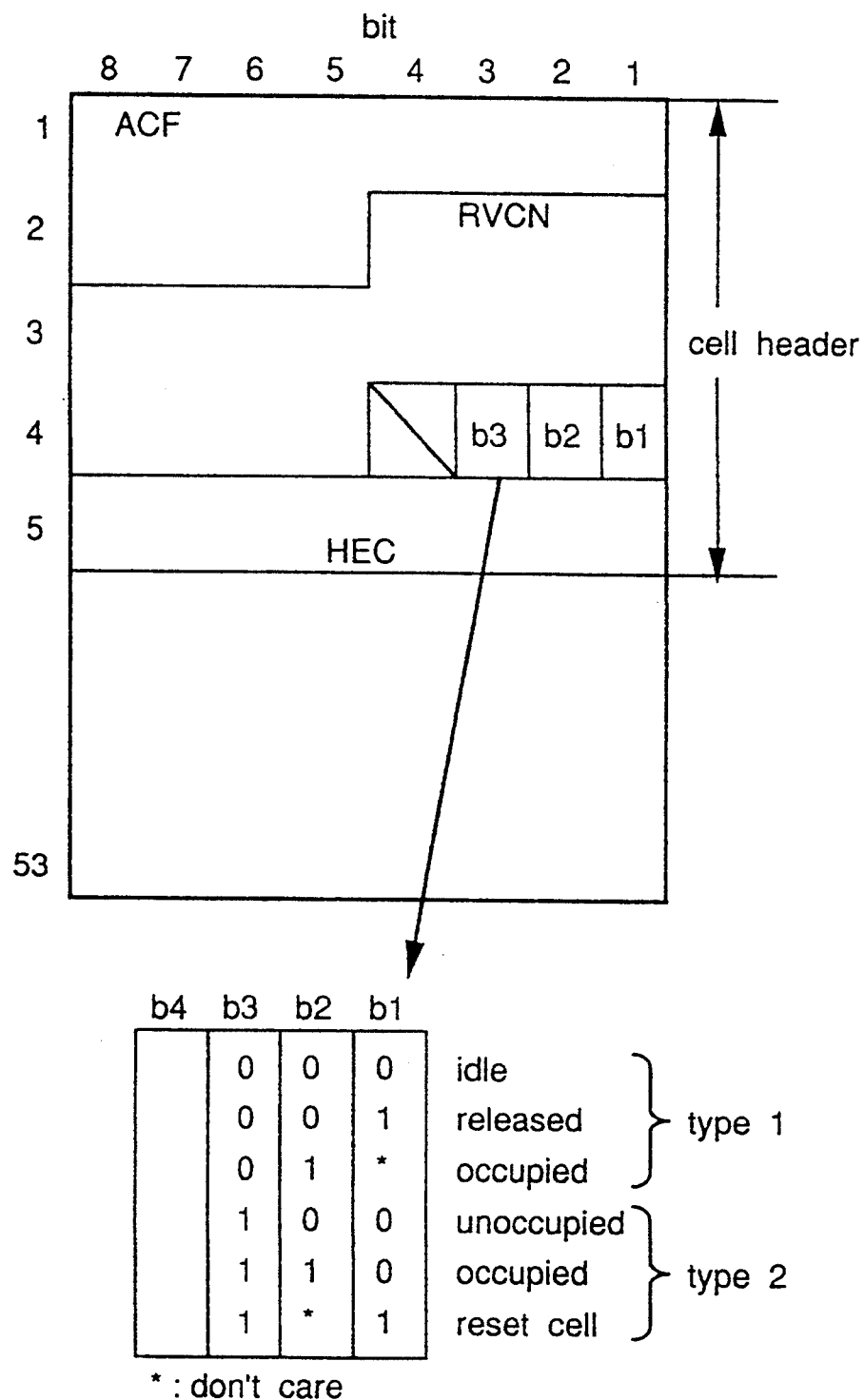
FIG. 2 is a drawing of the cell slot structure according to the present invention.

Referring to FIG. 2, each cell slot has a header in which a general flow control area comprising four bits (b1, b2, b3, b4) is provided. In the four bit area, bit b3 is used as a type bit for identifying the type of the cell slot. When the type bit is "0", it identifies that the cell slot is the type 1, and when it is "1", the cell slot is the type 2. Bits b2 and b1 are used for identifying the status of the cell slot. As to type 1 cell, when (b2, b1)=(0,0), it is indicated that the cell is in the idle state, when (b2, b1)=(0,1), in the release state, and when (b2, b1)=(1, *), in the occupied state, in which * can be either "0" or "1". As to type 2 cell, when (b2, b1)=(0,0), it is indicated that the cell is in unoccupied state, when (b2, b1)=(1,0), in the occupied state, and when (b2, b1)=(*, 1), the cell is the reset cell.

The use of the three states (occupied, released, or idle) has been described with relation to the conventional MARS network above, and further description is omitted below. The cell slot type is further described below.

The network controller 107 can allocate the available band capacity on the ring by type using the declaration bits provided in the cell slot headers as described above. Data output to the network from the communications terminal is written selectively to cell slots of the required type. As described above, there are two cell slot types: type 1 for connection-oriented data requiring call setting before communications begins; and type 2 for connectionless data such as used for sending data between computers.

When transmitting data from communications terminal 101 to communications terminal 102, parameters indicating, for example, the band capacity required for transmission are sent to the network controller 107 before data transfer begins when the data being sent is connection-oriented data. The network controller 107 accepts or denies the access request based on the current network status, including the previously accepted access requests and network traffic, and the current request value. If accepted, the network controller 107 allocates the required band capacity to the node. Since the request in this case is for type 1 data, type 1 cell slots are used for data transmission. It is to be noted that this method of accessing the ring when sending connection-oriented data from a node to the ring is the MARS system which is fully disclosed in Japanese Patent application No. 3-107802 (corresponding to U.S. patent application Ser. No. 07/882608 and to Canadian Patent application No. 2,077,029-9) assigned to the same assignee as the present application. The disclosure in Japanese Patent application No. 3-107802 (corresponding to U.S. patent application Ser. No. 07/882608 and to Canadian Patent application No. 2,077,027-9) is forming a part of this specification.

In connectionless communications the band used for data transmission is pre-allocated in a fixed amount for each node, and each node can use its allocated capacity freely as needed. Type 2 cell slots are used to send data over the ring in this case, but the ring is accessed using the conventional ATMR method described above. It is to be noted that the band capacity allocated for connectionless data transmission for each node and the proportion between the band allocated for each type on the ring can be changed after the network is in service.

Figure 3:
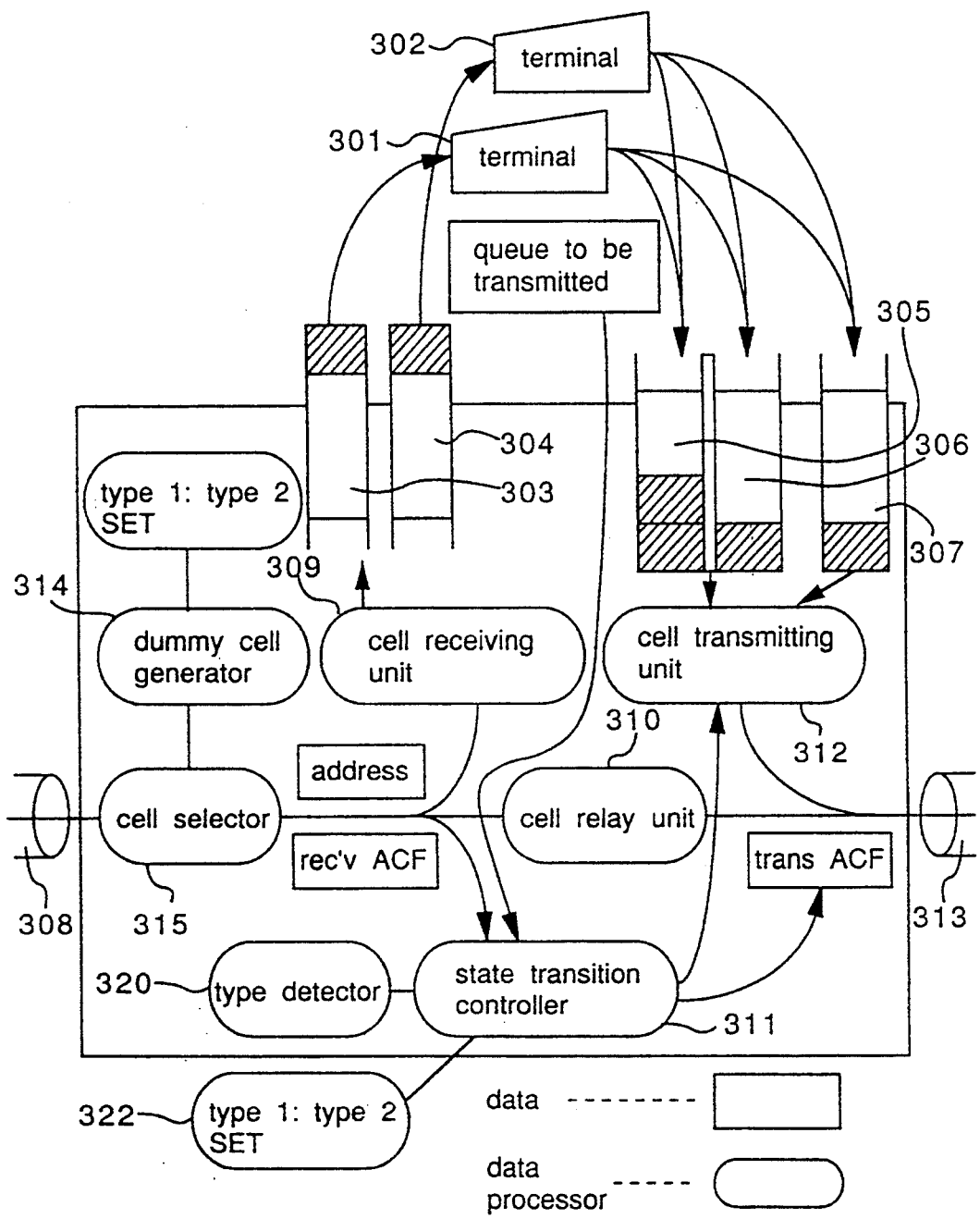
FIG. 3 is a block diagram of the node functions according to the preferred embodiment of the present invention.
Figure 6:
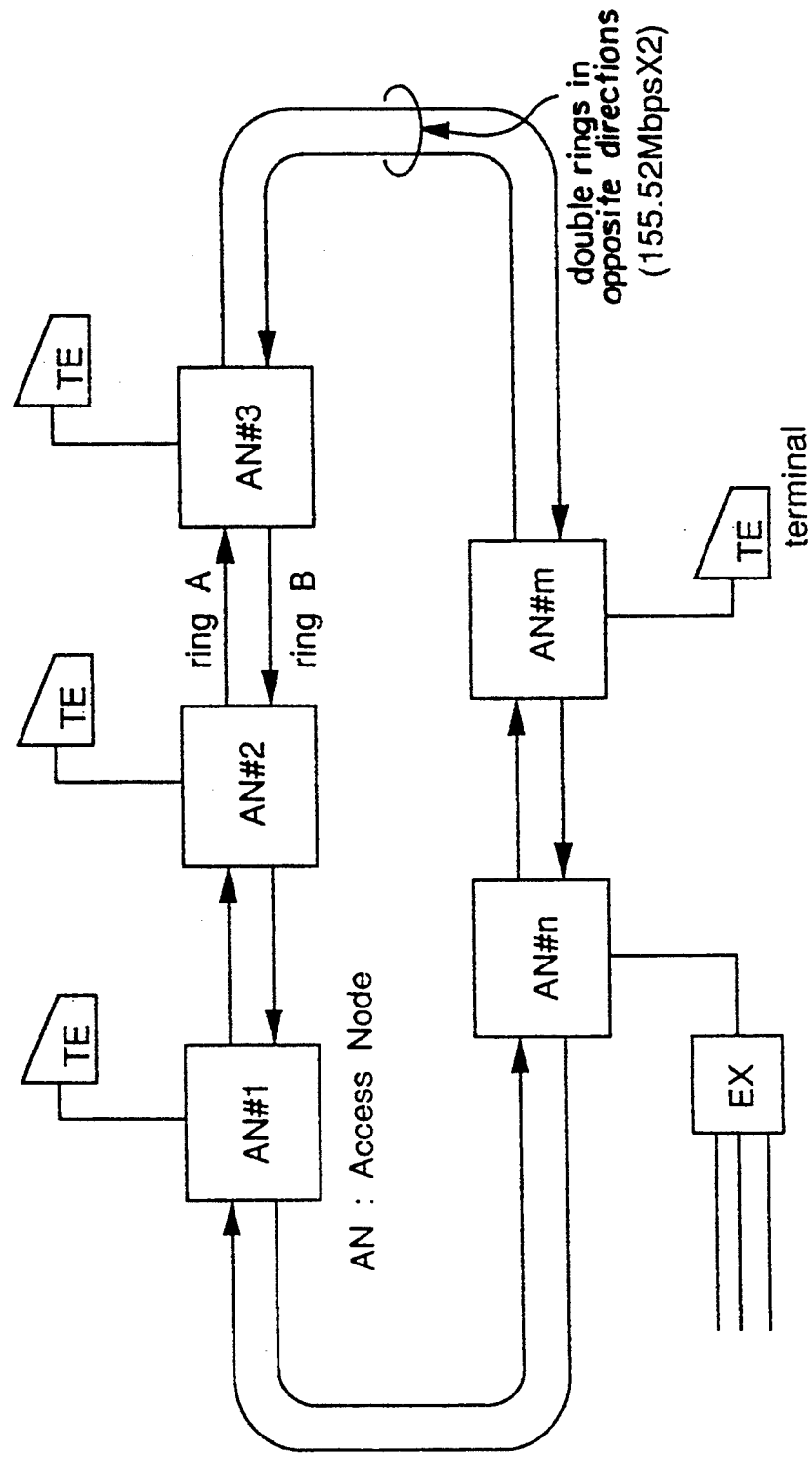
FIG. 6 is a diagram of a conventional ATMR network topology.
Figure 7:
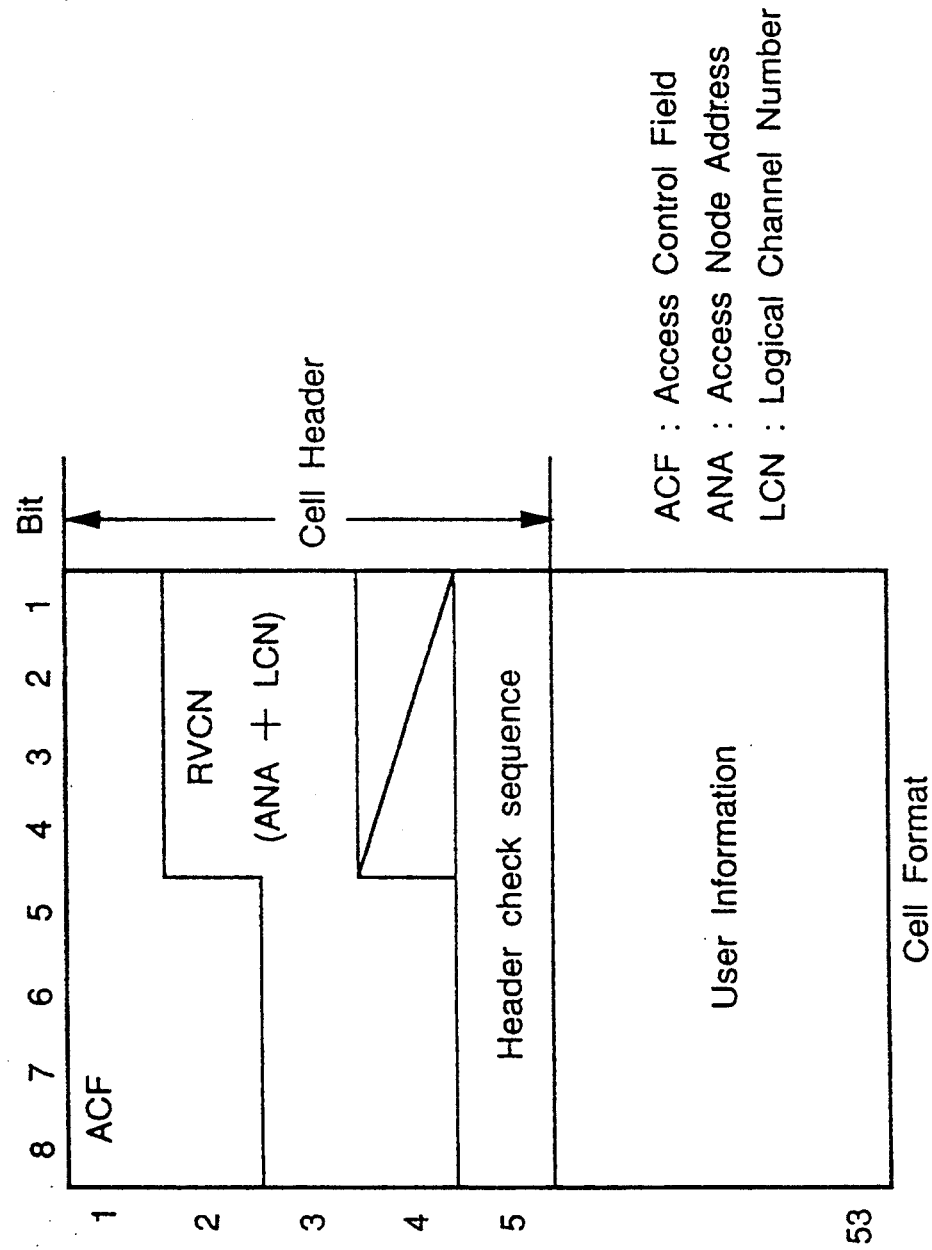
FIG. 7 is a drawing of the ATMR cell structure.
Figure 8:
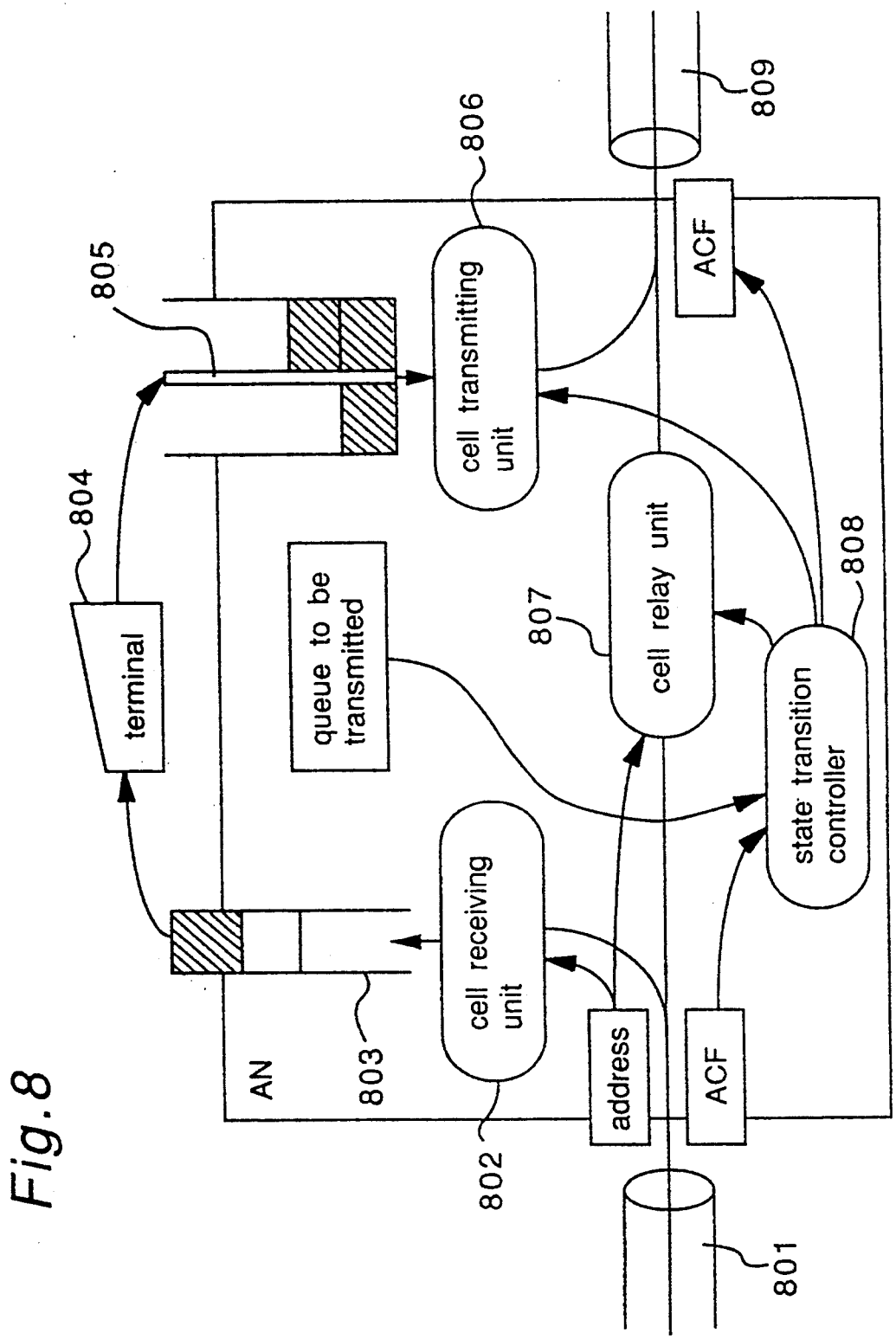
FIG. 8 is a block diagram of the node functions according to the conventional ATMR network.

The structure of each node is described below with reference to FIG. 3. Plural communications terminals 301 and 302 are connected to the node shown, and reception buffers 303 and 304 are provided for the terminals, respectively. First transmission buffers 305 and 306 are provided for the type 1 data, and a second transmission buffer 307 is provided for the type 2 data. In the preferred embodiment of the invention the first transmission buffer 305 for type 1 data is for the high quality data transmission, and the buffer 306 for type 1 data is for the normal quality data transmission. The nodes are linked by a reception ring 308 and transmission ring 313, and further comprise a cell receiving unit 309, cell relay unit 310, state transition controller 311, cell transmitting unit 312, dummy cell generator 314, and cell selector 315. The state transition controller 311 is coupled with a type detector 320 for detecting the type of the received cell, whether it is type 1 or type 2. Also, the dummy cell generator 314 is coupled with an occurrence ratio setting unit 321 for setting an occurrence ratio of type 1 cell and type 2 cell. Furthermore, particularly in the center node 104 which is connected with the network controller 107, an occurrence ratio setting unit 322 for setting an occurrence ratio of type 1 cell and type 2 cell is provided. Thus, the type 1 cells and type 2 cells are passed around the network in an interleaved manner at a predetermined ratio determined by the ratio setting unit 322. The operation of the dummy cell generator 314 and cell selector 315 will be described with specific relation to the loop-back operation of the network.

Transmission of type 1 data is described first. The type 1 data output from the communications terminal 301 or 302 is stored in the first transmission buffer 305 or 306 according to the priority class of the data. The MARS system described above is used to access the ring and send the data from the buffer to the cell slots on the ring, and further description is omitted below. It should be noted, however, that only type 1 cell slots are accessed on the ring.

Figure 1:
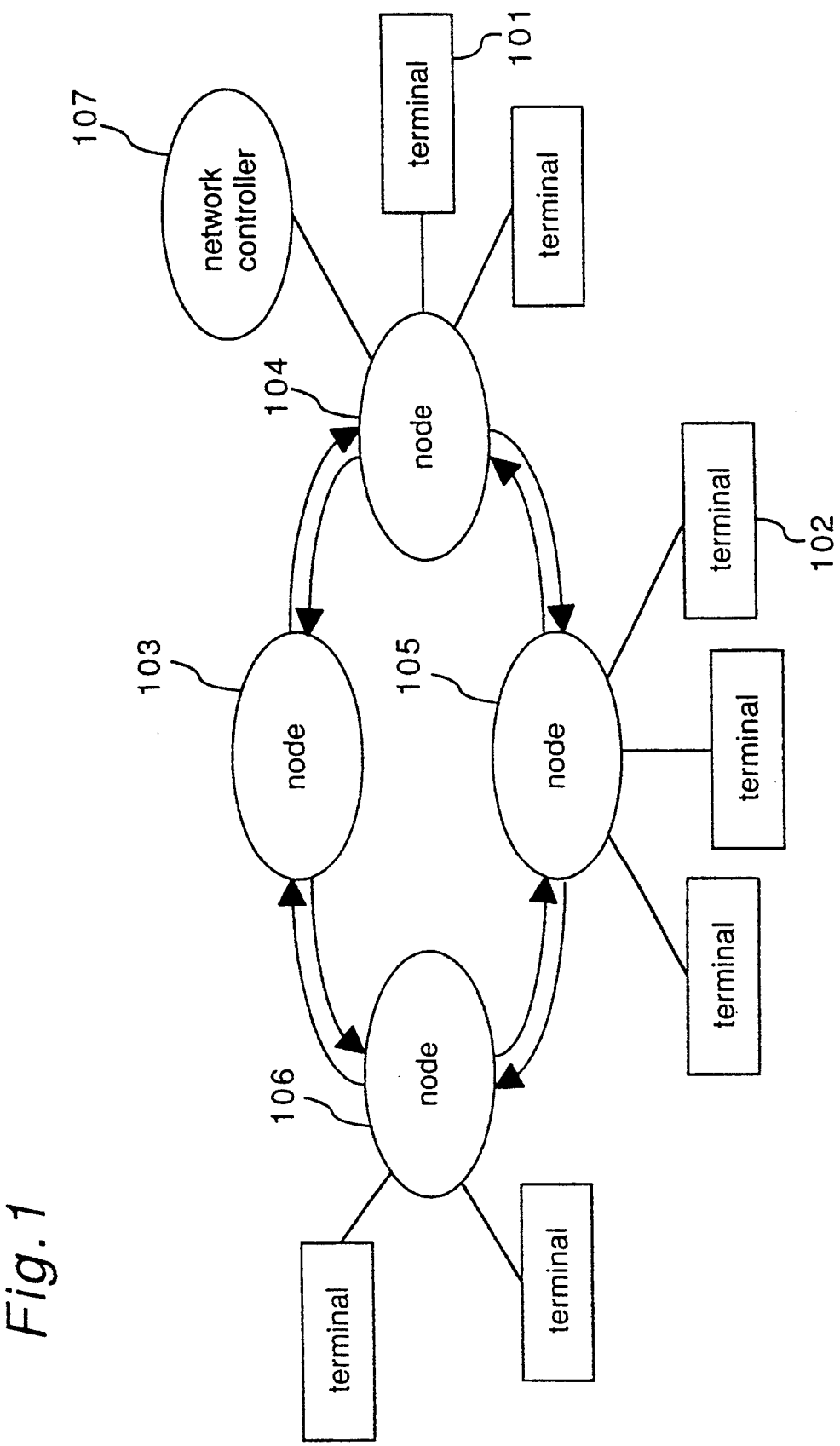
FIG. 1 is a diagram of the network topology according to the present invention; .

Control of the connection-oriented data (type 1) band allocated by the network controller 107 shown in FIG. 1 is described next.

This control is provided by the state transition controller 311. The band is defined as the number of cell slots guaranteed for use divided by the number of cell slots on the ring passing during a measured period of time. The transmission rate of the ring in this embodiment is approximately 1.4M cells/sec. If the total allocation for one node is a band of 20 k cells/sec. for the internally connected terminals, the band allocation is 20/1400 if the measured cycle is 1 k cells/sec., which means that the node can use 20 of 1400 cells passing in a predetermined measured period. Whether these 20 cells are used intermittently (that is in cyclically) or intensely (that is in burst) is left to the node control. By defining the measured cycle differently for each node, the use of cell slots on the ring is randomized.

Transmission of connectionless data (type 2) is described next.

Connectionless data output from the communications terminal 301 or 302 is stored in the second transmission buffer 307 of the node. Type 2 cell slots arriving at the node from the reception ring 308 are used to send cells from the second transmission buffer 307 to the ring. The window control and reset control protocols of the ATMR system as described above are used for ring access; cell reservation communications is not used.

It is to be noted that by the network controller 107, type 1 cells and type 2 cells are passed around the ring network in a predetermined sequence depending on the requirements from various nodes.

Operation of the dummy cell generator 314 and cell selector 315 is described next.

The dummy cell generator 314 retains the patterns for both type 1 and type 2 cell patterns, and generates idle state type 1 cells and either reset or unoccupied state type 2 cells. The dummy cells are generated as reset cells at each normal reset cycle, and unoccupied cells are generated at all other times. When a fault in the transmission path is detected by the data receiver (not shown in FIG. 1) on the reception ring 308, the cell selector 315 selects the dummy cell generator 314 to generate cells.

When dummy cells are produced, the cell receiving unit 309 determines that there are transmission cells (unoccupied state cell slots) from any upstream nodes, forwards cells to the cell relay 310, and outputs data from the transmission buffers 305 or 306. It is therefore possible to maintain communications between this node and downstream nodes even when a transmission path fault occurs on the reception ring 308 side of the node. It is to be noted that the dummy cell generator 314 and cell selector 315 provided separately in the preferred embodiment of the invention can also be integrated to a single unit.

As thus described, the present invention defines three states for the cell slots traveling the ring, and uses the released state cell slots in particular to negotiate use of the band between nodes. The cell slots on the ring can therefore be more efficiently used for data transmission, and the transmission delay time can be reduced. In a mixed CBR and VBR data environment, CBR data is also protected from the effects of burst transmission of VBR data.

Cell slots are also defined as one of two types. The band capacity is allocated for connectionless data transmissions between computers, and connection-oriented data transmission, and both the ring access method and transmission buffers are used according to the data type. As a result, the effects of non-cyclical, high burst connectionless data transmissions on other network traffic is eliminated for more efficient overall network performance.

Furthermore, because a dummy cell generator in each node generates dummy cells when a transmission path fault occurs, cells affected by the transmission path fault are not throughput, and communications can be maintained between nodes not linked directly through the fault. In addition, the proportion between cell types allocated for the band can be maintained when a fault occurs and loop-back control is implemented by programming the dummy cell generator to produce type 1 and type 2 cells in the same proportion as the cells traveling on the ring.

As described hereinabove, the utilization rate of the ring can be increased by setting the cell slots traveling around the ring to one of three states. In a mixed CBR data and VBR data environment, the affects of the transmission characteristics of one data type on the other can be avoided, and the data transmission delay time can be reduced. In addition, by allocating the band used by connection-oriented data and connectionless data, and using different ring access systems for each data type, transmission of each data type can be prevented from affecting the other. As a result, data can be transmitted over the network according to the traffic characteristics of differing data types.

Furthermore, when a transmission path fault occurs and loop-back control or another control method is implemented to maintain communications between unaffected nodes, communication of type 1 and type 2 data can be maintained by programming the dummy cell generator to output type 1 and type 2 dummy cells in the same proportion as that of the ring before the transmission path fault occurred.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A packet communications network transmitting data between nodes by the use of a plurality of cell slots circulating the network, the network being characterized by a bandwidth, the network comprising:
   a plurality of nodes connected in a ring network;
   a network controller connected to one of said nodes for allocating one of a plurality of portions of said bandwidth to each of said nodes;
   a center node inserted in said ring network for sequentially generating, at a selected rate, first and second types of cell slots for transmitting first and second types of data, respectively, each of said cell slots including a type code identifying said cell slot as being associated with one of said first and second types of data, each of said cell slots including a status code defined for use according to a first ring access system when said cell slot is associated with said first type of data and defined for use according to a second ring access system when said cell slot is associated with said second type of data;
   each of said plurality of nodes comprising:
      address detection means for detecting whether a node receiving a cell slot is an addressee node;
      type detection means for detecting whether said received cell slot is associated with said first data type or said second data type;
      status detection means for detecting said status code of said received cell slot;
      data putting means for putting data on said received cell slot according to said first ring access system when said received cell slot is of said first data type and according to said second ring access system when said received cell slot is of said second data type; and
      status transition means for changing said status code of said received cell according to said ring first access system when said received cell is of said first data type and according to said second ring access system when said received cell slot is of said second data type.

2. The packet communications network of claim 1, wherein said status detection means detects whether said received cell slot is in an idle state, an occupied state or a released state in accordance with said first ring access system when said received cell slot is of said first data type, and whether said received cell slot is an unoccupied cell, an occupied cell or a reset cell in accordance with said second ring access system when said received cell slot is of said second data type.

3. The packet communications network of claim 2, wherein said data putting means puts data on said received cell slot which is either in said idle state or said released state in accordance with said first ring access system when said received cell slot is of said first data type, and on said unoccupied cell in accordance with said second ring access system when said received cell slot is of said second data type.

4. The packet communications network of claim 2, wherein said status transition means changes, in accordance with said first ring access system when said received cell slot is of said first type, said received cell slot's status code from said idle status to said occupied status if said node receiving said received cell slot puts data to said received cell slot, from said idle status to said released status if said node receiving said received cell slot waives its right to use said node receiving said received cell slot, or from said released state to said idle status if said received cell made one complete turn around said ring with said released status without being used by said other nodes.

5. The packet communications network of claim 1 further comprising dummy cell generating means for sequentially generating, at said selected rate, said first and second types of cell slots when a network transmission path fault occurs in a path upstream of said node receiving said received cell slot.

6. The packet communications network of claim 5, wherein said dummy cell generating means generates said first type cell slots in said idle status and said second type cell slots in a repetition of one of said reset cells and a predetermined number of said unoccupied cells, said first and second type cell slots being interleaved in a predetermined ratio.

7. A packet communications network for transmitting data between nodes by the use of cell slots circulating the network comprising:
   plural nodes connected in a ring network;
   a network controller connected to one of said nodes for allocating the number of usable cell slots per unit time to each node;
   a center node inserted in said ring network for sequentially generating, at a selected rate, first and second types of cell slots for transmitting first and second types of data, respectively, each cell slot having a type code for identifying either one of said first and second types, and a status code for identifying, when the cell slot is the first type, any one of an idle state, an occupied state and a released state, and for identifying, when the cell slot is the second type, either the cell is an unoccupied cell, occupied cell or a reset cell;

each of said plural nodes comprising:

address detection means for detecting whether an addressee node is a receiving node or any other node;

type detection means for detecting whether a received cell is the first type or the second type;

status detection means for detecting, when the received cell is the first type, whether the received cell is in the idle state, the occupied state or the released state, and for detecting, when the received cell is the second type, whether the received cell is the unoccupied cell, the occupied cell or the reset cell;

data putting means for putting, when the received cell is the first type, data on the cell slot which is in either one of the idle state and released state, and for putting, when the received cell is the second type, data on the unoccupied cell slot; and status transition means for changing, when the received cell is the first type, the status of the received cell from idle to occupied if the node puts data to the received cell, from idle to released if the node waives its right to use the cell slot, or from released to idle if the released cell makes one complete turn around the ring network without being used by other nodes; and dummy cell generating means connected to the ring network for sequentially generating, at said selected rate, said first and second types of cell slots when a network transmission path fault occurs in a path upstream of said dummy cell generating means.

8. A packet communications network for transmitting data between nodes by the use of cell slots circulating the network comprising:

plural nodes connected in a ring network;

a network controller connected to one of said nodes for allocating the number of usable cell slots per unit time to each node;

a center node inserted in said ring network for sequentially generating, at a selected rate, first and second types of cell slots for transmitting first and second types of data, respectively, each cell slot having a type code for identifying either one of said first and second types, and a status code for identifying, when the cell slot is the first type, any one of an idle state, an occupied state and a released state, and for identifying, when the cell slot is the second type, either the cell is an unoccupied cell, occupied cell or a reset cell;

each of said plural nodes comprising:

address detection means for detecting whether an addressee node is a receiving node or any other node;

type detection means for detecting whether a received cell is the first type or the second type;

status detection means for detecting, when the received cell is the first type, whether the received cell is in the idle state, the occupied state or the released state, and for detecting, when the received cell is the second type, whether the received cell is the unoccupied cell, the occupied cell or the reset cell;

data putting means for putting, when the received cell is the first type, data on the cell slot which is in either one of the idle state and released state, and for putting, when the received cell is the second type, data on the unoccupied cell slot; and status transition means for changing, when the received cell is the first type, the status of the received cell from idle to occupied if the node puts data to the received cell, from idle to released if the node waives its right to use the cell slot, or from released to idle if the released cell makes one complete turn around the ring network without being used by other nodes; and dummy cell generating means for sequentially generating, at said selected rate, said first and second types of cell slots when a network transmission path fault occurs in a path upstream of said node.

9. The packet communications network of claim 8, wherein each of said plural nodes further comprises first buffer means for storing first type data to be transmitted by the first type cells and second buffer means for storing second type data to be transmitted by the second type cells.

10. The packet communications network of claim 8, wherein said first type data is a connection-oriented data, and said second type data is a connectionless data.

11. The packet communications network of claim 8, wherein said dummy cell generating means generates the first type cell slots in the idle status, and the second type cell slots in a repetition of one reset cell and a predetermined number of unoccupied cells, and said receiving first type cell slots and said second type cell slots being interleaved in a predetermined ratio.

12. The packet communications network as claimed in claim 8, wherein said ring network is doubled.

* * * * *